March 26, 1963 E. W. ALMQUIST, JR 3,082,639
GEAR SHIFT

Filed Sept. 11, 1962 2 Sheets-Sheet 1

INVENTOR.
EDGAR W. ALMQUIST JR.
BY
ATTORNEY

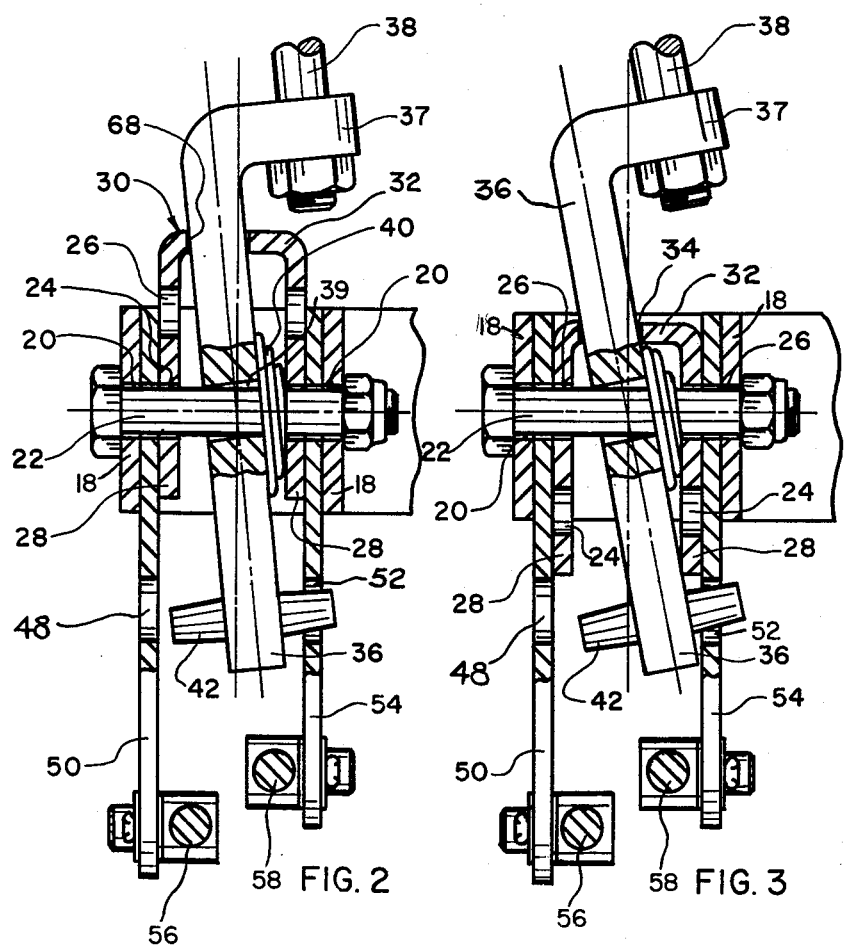

3,082,639
GEAR SHIFT
Edgar W. Almquist, Jr., % Almquist Engineering Co., Milford, Pa.
Filed Sept. 11, 1962, Ser. No. 222,856
1 Claim. (Cl. 74—473)

My invention relates to a gear shifting mechanism for automotive and similar engines.

One object of the invention is to produce an improved gear shifting mechanism of the type set forth.

For ordinary driving, and especially for use by women drivers, ease of operation is more important than rapid gear shifting and rapid acceleration, and therefore, a gear shifting mechanism which has a relatively wide neutral gate and the shifting handle of which can be easily moved from one gear ratio position to another is acceptable. But, for use where rapid acceleration and, hence, rapid change of gears is paramount, a narrower neutral gate and transition from one gear position to another is preferred.

It is therefore a further object of the invention to produce an improved gear shifting mechanism which, by the use of a pair of pliers and without any special skill, can be quickly adapted for either type of driving.

A still further object is to produce a gear shift mechanism which has a minimum number of parts and which can be readily installed and adjusted to provide maximum comfort to the driver.

The full nature of the invention will be understood from the following specification and the accompanying drawings in which:

FIG. 2 is a front elevational view showing the gear shifting mechanism adapted for use in rapid acceleration driving.

FIG. 3 is similar to FIG. 2, but showing the gear shift mechanism adapted for ordinary driving.

Figure 1:
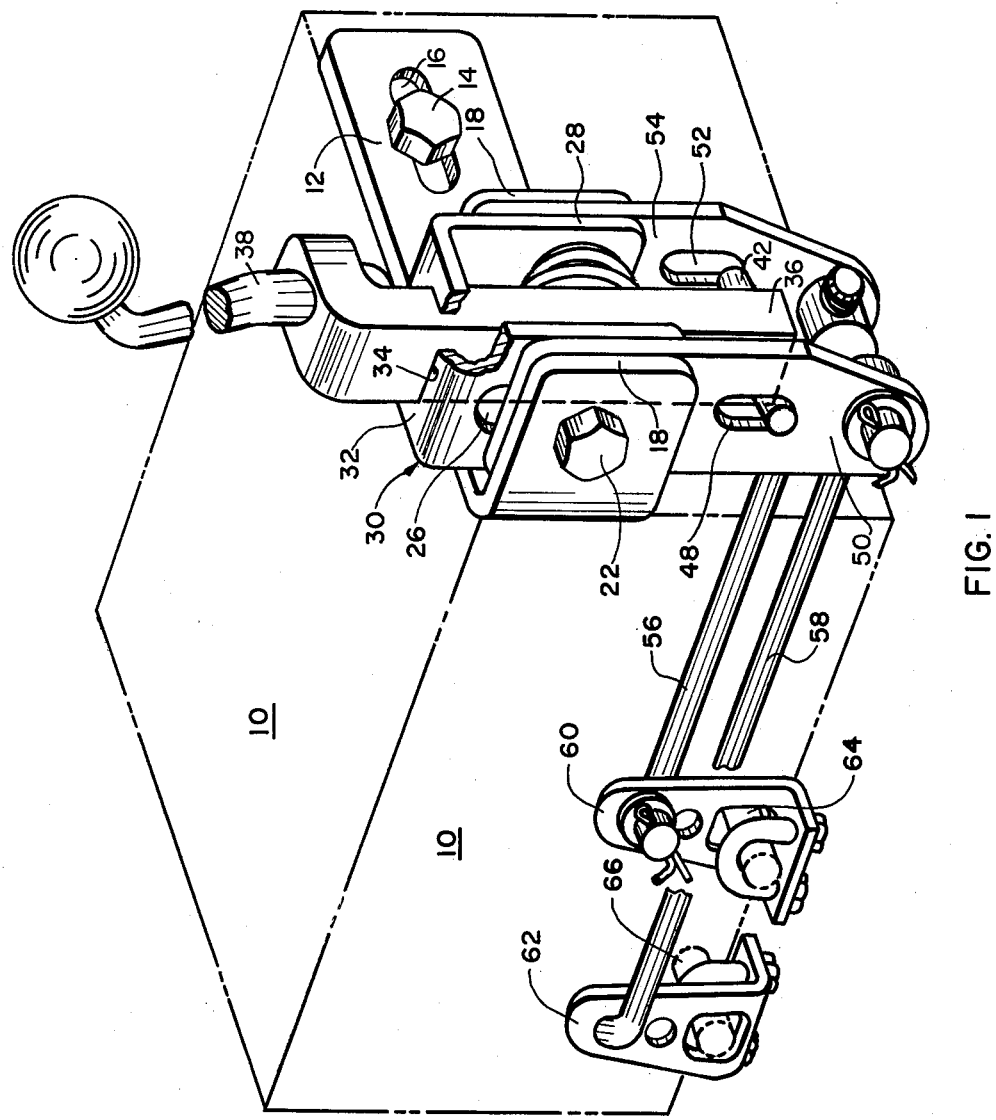
FIG. 1 is an enlarged perspective view of a gear shift mechanism embodying my invention and diagrammatically illustrating the manner of mounting the same on the transmission housing.

In the drawings, 10 designates a transmission housing of an engine on which a gear shifting mechanism of my invention is mounted by means of mounting bracket 12 which is secured for lateral adjustment relative to the driver's seat by means of bolts 14 passing through adjustment slots 16 and engaging the housing. Mounting bracket 12 carries, or is integral with, walls 18 which are provided with openings 20 for receiving assembly bolt 22. Assembly bolt 22 is also adapted to pass through lower holes 24 or upper holes 26 in limbs 28 of a fulcrum member which is preferably an inverted U-shaped bracket 30. The bight portion 32 of bracket 30 has an aperture 34 through which passes actuating arm 36. The upper end of selector lever 36 is bent, as at 37, and threadedly engages the lower end of a gear shift lever 38, the upper end of which is accessible to the driver of the vehicle. Actuating arm 36 is normally biased to a substantially vertical position in which it abuts the left limb 28 of the inverted U-shaped bracket 30 by spring 40. The lower end of arm 36 carries selector pin 42 which is selectively engageable with opening 48 in shifting plate 50, or with opening 52 in shifting plate 54. It will be understood that plates 50 and 54 are rotatable on assembly bolt 22.

The lower ends of plates 50 and 52 are adjustably connected, by links 56 and 58, to plates 60 and 62 and conventional gear actuators 64 and 66 to the gears, not shown. The manner in which the gears are shifted from low to second, to high, or to reverse and back, is conventional and need not be described. For the purpose of this disclosure, it is thought sufficient to point out that in the process of shifting, lever 38 and arm 36 must be moved to the position of FIG. 2, against the force of spring 40, and that arm 36 rotates about the edge of opening 34 which serves as a fulcrum 68. Actuating member 36 is provided with a bore 39 through which assembly bolt 22 passes, said bore being large enough to permit arm 36 to rock relative to the bolt, as shown in FIGS. 2 and 3.

When it is desired to adapt the mechanism for fast acceleration, assembly bolt 22 is passed through lower holes 24, as shown in FIG. 2. This provides a narrower gate for rapid shifting and rapid acceleration, but it also makes compression of spring 40 and, hence, movement of lever 38, more difficult. To adapt the mechanism for slower and easier shifting, bolt 22 is passed through upper openings 26. This brings the fulcrum point 68 closer to spring 40 and makes movement of the shifting handle 38 easier. But it also provides a wider neutral gate and, therefore, slower shifting. This effect can be seen from the angular relation of the intersecting broken lines in FIGS. 2 and 3.

It will be seen that my improved gear shifting mechanism has an irreducible number of parts; that it can be installed, adjusted, or removed by means of a wrench, or the like, and that it can be adapted for rapid shifting or for ordinary driving by merely engaging bolt 22 with openings 24 or 26, as desired.

What I claim is:

A gear shifting mechanism for use in connection with the transmission of an engine, said mechanism including
a mounting bracket,
means for securing said bracket to the transmission housing,
an assembly bolt carried by said bracket,
a fulcrum member including a horizontal portion and a vertical portion, there being an opening in said horizontal portion,
a pair of gear selector plates rotatable on said bolt,
a selector arm loosely passing through said opening and selectively engageable with said plates,
said arm having a bore therein through which said bolt passes whereby said arm is rotatable about the axis of said bolt, said bore also loosely receiving said bolt whereby said arm may be rocked relative to the axis of said bolt with an edge of said opening providing a fulcrum for said arm,
a spring on said bolt bearing against said arm to resist the rocking movement of said arm,
there being lower and upper holes in the vertical portion of said fulcrum member through which said bolt may be selectively passed to decrease, or to increase, the distance between said fulcrum and said bolt corresponding to increase, or decrease, the mechanical advantage available when said arm is moved against the tension of said spring.

No references cited.